3,205,093
CYCLIZED RUBBER COATED POLYETHYLENE OR POLYPROPYLENE ARTICLES
John E. Lynch, Emerson, N.J., assignor to Interchemical Corporation, New York, N.Y., a corporation
No Drawing. Filed May 15, 1962, Ser. No. 194,959
5 Claims. (Cl. 117—138.8)

This invention relates to coated polyolefin structures and to a method of coating sheets, bottles, toys and other articles of manufacture made of polyolefins, particularly polyethylene and polypropylene.

The problem of coating and printing on polyolefins, particularly polyethylene and polypropylene is well known in the coating art. In general, coatings display very poor adhesion to polyolefins. Slight abrasion, such as gentle scraping with the finger nail removes coatings from polyolefins as does even minimal bending or stretching.

Many techniques have been used in treating polyolefins in order to overcome this lack of adhesion. These techniques include: treating the surface by the photochemical action of chlorine to cause surface oxidation; acid treatment of the surface; flame treating the surface; exposure of the surface to the action of ozone; and treatment of the surface with electron beams or gamma rays. While these techniques have been effective, they have also been time consuming, difficult and expensive, particularly when used on preformed articles. In fact, the expense of such a pretreatment made the use of polyolefins such as polyethylene and polypropylene impractical in many applications where an inexpensive colored polyolefin product was desired, e.g., in toys. Among other advantages, this invention makes possible relatively inexpensive polyolefin, articles colored by coating.

This invention provides a novel method of applying a colored coating to untreated and unprimed polyethylene. It has been found that a coating composition of pigment dispersed in a solution of cyclized rubber in an aromatic hydrocarbon solvent provides a superior inexpensive colored coating for polyethylene and polypropylene displaying excellent adhesion in a single coating. This novel coating may also be applied as a top coating to polyolefins in the unpigmented state to provide polyethylene and polypropylene with a high gloss where in the uncoated state, they are flat and lackluster. This coating is also effective as an intermediate coating or undercoat for bonding polyethylene and polypropylene with a wide variety of top coats which do not readily adhere directly to polyolefins.

In accordance with this invention, a solution of cyclized rubber in a volatile aromatic solvent is applied to the surface of the polyolefin sheet or preformed article. The coated material is then dried by air-drying or baking.

Excellent results have been obtained when using high density, low density and medium density polyethylene as well as polypropylene for the substrate. The cyclized rubber may be made by any conventional method such as condensing rubber with metallic or metalloid halide catalysts such as stannic chloride, titanium tetrachloride, ferric chloride and antimony pentachloride in a suitable solvent. Upon the treatment of the resultant product with acetone or alcohol, the salt is reformed together with formation of cyclized rubber. Similar results may be obtained following the methods set forth in "The Paper Trade Journal," page 96, February 23, 1939, "Rubber Age," April 1939 and "Journal of Industrial Engineering Chemistry," XIX, 1033, XXVI, 125, and XXXIII, 389. Details of preparation are also disclosed in U.S. Patents Nos. 1,797,188; 1,846,247; 1,853,334 and 2,052,931.

The solvent may be any available aromatic solvent such as toluene, xylene, benzene, as well as high-flash aromatic naphthas.

In the specifications and claims which follow all proportions are by weight unless otherwise stated.

Preferably the cyclized rubber content of the solution may vary from as low as 1% or even lower up to 40% of the total solution weight. When the cyclized rubber coating is to act as an intermediate coat to adhere top coats to the polyolefin substrate, the cyclized rubber content is lower, preferably between 1% and 10%, than when the cyclized rubber coating is used as a top coat in which case, the cyclized rubber content is preferably between 8% and 20%.

In coated articles of this invention in which the coating acts as an intermediate coating, adhesion considerably greater than uncoated polyolefins is displayed toward a wide variety of top coats including coatings of vinyl resins such as vinyl chloride and vinylidene chloride-containing resins; urea-formaldehyde, melamine-formaldehyde and phenol-formaldehyde resins; alkyd and oil modified alkyd coatings; cellulosic coatings such as coatings of cellulose acetate and cellulose propionate; epoxy coatings; and acrylic coatings such as coatings of acrylate resins. The coated articles also display improved adhesion to printing inks.

As previously mentioned, the article of this invention carrying an external cyclized rubber coating may provide an efficient and inexpensive method of coloring polyolefins. To achieve this effect, pigment is dispersed in the cyclized rubber coating solution to be applied. When so incorporated, the pigment content preferably varies from between 14% and 100% of the weight of the cyclized rubber. Any conventional pigment used in the paint and ink industry may be used, e.g., titanium dioxide, zinc white, zinc oxide, basic carbonate of white lead, zinc yellow, chrome yellow, chrome green, iron oxide yellow, iron oxide red, or iron oxide black.

The cyclized rubber solutions used in this invention may also include any of the conventional plasticizers for cyclized rubber such as methyl and ethyl abietate, dibutyl phthalate, butyl stearate, tricresyl phosphate, hydrogenated alkyl esters of abietic acid, dibutyl sebacate, dioctyl sebacate, monoamyl naphthalene, diamyl naphthalene, raw and heat treated chinawood oil, raw and processed linseed oil, fish oil, tung oil, polymerized terpenes and chlorinated biphenyls and triphenyls.

The coating composition may be applied to the polyolefin substrate using a variety of conventional techniques such as dipping, spraying, flowing, knife coating, and roller coating. Where the coating is to be used as an intermediate coating a very thin coating in the order of from 0.05 to 0.2 mil is preferred. Where the coating is to be used as a top coat, it preferably has a thickness at least 0.3 mil, the thickness varying with the intended use of the finished articles, e.g. in high density polyethylene toys, the cured top coat preferably has a thickness of from 0.3 to 0.5 mil.

The following examples will illustrate the practice of this invention.

*Example 1*

A solution is prepared by dissolving 17 parts of Pliolite NR in 73 parts of toluene. (Pliolite NR is a thermoplastic rubber derivative known as cyclized rubber having a density of 1.05 and a softening point range of 55°–65° C. which is made by condensing rubber with a catalyst of the tin tetrachloride type. Specific details of its preparation, structure are set forth in the Paper Trade Journal, page 96, February 23, 1939; Rubber Age, April 1939, and J.I.E.C. XIX, 1033, XXVI, 125, and XXXIII, 389. (Details are also disclosed in U.S. Patents Nos. 1,797,188, 1,846,247, 1,853,334 and 2,052,931.) A sheet of high density polyethylene is dipped into the solution. The coated sheet is then dried at 150° F. for 15 minutes. The coated sheet has a high gloss in comparison with the uncoated poly-

Example 2

A dispersion of 40 parts of TiO₂ in a solution of 60 parts of Pliolite NR cyclized rubber in 600 parts of toluene is spray coated onto a toy made of high density polyethylene. The coating is dried for 15 minutes at 150° F. The dried coat has a thickness of 0.3 mil. The toy has a white coating of high gloss and excellent adhesion to the polyethylene substrate.

Example 3

Example 1 is repeated using the same ingredients, proportions and conditions except that instead of the polyethylene sheet, a sheet of polypropylene having a crystalline M.P. of 333° F. and a specific gravity of 0.905 (ASTM-D792-50) is primed and coated. The coated sheet displays the same superior adhesion and gloss properties as does the sheet described in Example 1.

Example 4

A composition comprising 25 parts of Pliolite NR cyclized rubber, 17.5 parts of polytung oil, .05 part of lead naphthanate, .01 part of cobalt naphthanate and 158.44 of Solvesso 150, a high flash aromatic naphtha having a K.B. value of 89 to 90 and a boiling range of 367° to 450° F. is flow coated on medium density polyethylene bottles and baked at 150° F. for 15 minutes to provide a coating 0.1 mil in thickness. The coated bottle is then spray coated with a 10% solution of a copolymer of 85% vinylidene chloride and 15% acrylonitrile in methyl isobutyl ketone and baked at 150° F. for 15 minutes to provide a coating 0.3 mil in thickness of cured copolymer on said coated polyethylene. The coating displays excellent adhesion to the polyethylene bottle.

Example 5

Example 4 is repeated using the same first coat but instead of the vinylidene chloride-acrylonitrile top coat, there is used a coating comprising 100 parts of a solvent containing 5% ethylene glycol monobutyl ether; 45% methyl isobutyl ketone and 50% toluene; 2.9 parts butylated urea-formaldehyde resin; 5.6 parts diethylene triamine and 91.5 parts of Epon 1001 (an ethoxylene resin which is the reaction product of Bisphenol A and epichlorohydrin having an average molecular weight of 875, an epoxide equivalent weight of 450-525 and an average of 1.7 to 1.9 epoxides per molecule). This top coat is applied in accordance with the procedure of Example 4 to produce a coated article having the same properties as that of Example 4.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An article of manufacture comprising a polyolefin substrate selected from the group consisting of polyethylene and polypropylene carrying a coating consisting essentially of cyclized rubber.

2. An article of manufacture comprising a polyolefin substrate selected from the group consisting of polyethylene and polypropylene carrying a coating consisting essentially of cyclized rubber and pigment.

3. An article of manufacture comprising a polyolefin substrate selected from the group consisting of polyethylene and polypropylene carrying a coating consisting essentially of cyclized rubber and a plasticizer for said rubber.

4. An article of manufacture comprising a polyolefin substrate selected from the group consisting of polyethylene and polypropylene carrying a coating consisting essentially of cyclized rubber, a plasticizer for said rubber and pigment.

5. An article of manufacture comprising a substrate consisting essentially of a member selected from the group consisting of polyethylene and polypropylene carrying an external coating consisting essentially of cyclized rubber.

References Cited by the Examiner

UNITED STATES PATENTS

| | | | |
|---|---|---|---|
| 2,238,694 | 4/41 | Graves | 117—138.8 |
| 2,426,820 | 9/47 | Evans et al. | 161—242 XR |
| 2,661,340 | 12/53 | Veersen | 260—94.7 XR |
| 3,035,933 | 5/62 | Warner | 117—47 XR |

FOREIGN PATENTS 770,576   3/57   Great Britain.

WILLIAM D. MARTIN, *Primary Examiner.*

JOSEPH B. SPENCER, RICHARD D. NEVIUS,
*Examiners.*